(12) United States Patent
Oota et al.

(10) Patent No.: US 7,383,068 B2
(45) Date of Patent: Jun. 3, 2008

(54) COLLAPSIBLE MOBILE COMMUNICATION TERMINAL DEVICE

(75) Inventors: Yasuhiko Oota, Yokohama (JP);
Kazufumi Takeshita, Yokohama (JP);
Naomasa Suzuki, Yokohama (JP); Seiji Miyashita, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 271 days.

(21) Appl. No.: 10/550,445

(22) PCT Filed: Mar. 18, 2004

(86) PCT No.: PCT/JP2004/003640

§ 371 (c)(1),
(2), (4) Date: Sep. 21, 2005

(87) PCT Pub. No.: WO2004/086734

PCT Pub. Date: Oct. 7, 2004

(65) Prior Publication Data

US 2007/0004474 A1    Jan. 4, 2007

(30) Foreign Application Priority Data

Mar. 24, 2003   (JP)   ............................. 2003-080890

(51) Int. Cl.
*H04M 1/00* (2006.01)
(52) U.S. Cl. ............................... 455/575.3; 455/550.1; 455/564; 455/575.1; 362/24
(58) Field of Classification Search ........... 455/550.01, 455/575.3, 564–565, 569.1, 90, 569.2, 575.1, 455/575.8; 16/324, 319; 361/679, 724; 349/58, 61; 379/433.01, 433.06, 433.07, 379/433.11, 432, 440; 362/88, 23–24
See application file for complete search history.

(56) References Cited

U.S. PATENT DOCUMENTS

| 6,254,249 | B1 * | 7/2001 | Kim et al. ................ 455/550.1 |
| 6,269,256 | B1 * | 7/2001 | Nakamura ................ 455/575.3 |
| 6,535,749 | B1 * | 3/2003 | Iwata et al. .............. 455/556.2 |
| 6,839,101 | B2 * | 1/2005 | Shima ......................... 349/58 |
| 2004/0072589 | A1 * | 4/2004 | Hamamura et al. ....... 455/550.1 |

FOREIGN PATENT DOCUMENTS

| JP | 6-30086 | 2/1994 |
| JP | 6-30086 A | 2/1994 |
| JP | 11-41328 | 2/1999 |
| JP | 2002-152829 | 5/2002 |
| JP | 2002232534 A * | 8/2002 |
| JP | 2002-314658 | 10/2002 |
| WO | 2003024063 A1 | 3/2003 |

OTHER PUBLICATIONS

Chinese Office Action with English translation. Jan. 4, 2008.

* cited by examiner

*Primary Examiner*—George Eng
*Assistant Examiner*—Kamran Afshar
(74) *Attorney, Agent, or Firm*—Pearne & Gordon LLP

(57) ABSTRACT

A hinge mechanism which coupled an upper side housing and a lower side housing in such a manner that they can be opened and closed, a push button which opens the hinge mechanism when it was depressed, light emission section which has the push button lighted up at the time of light emission, and control section which turns on the light emission section (step S4) when the hinge mechanism is closed at the time that there was an incoming call (step S2) are disposed. By this means, since the push button for opening the hinge mechanism is lighted up when a portable communication terminal apparatus was folded at the time that there was an incoming call, it becomes possible for a user to easily recognize that the user simply depress the push button for the purpose of a talk over the phone.

6 Claims, 8 Drawing Sheets

FIG. 7

|  | OPENING | CLOSING | CLOSING → OPENING |
|---|---|---|---|
| ONE-PUSH BUTTON LED | OFF | ON | OFF |
| TALK KEY LED | ON | OFF | OFF |
| INCOMING CALL LED | ON | ON | OFF |

COLLAPSIBLE MOBILE COMMUNICATION TERMINAL DEVICE

TECHNICAL FIELD

This invention relates to a foldable type portable communication terminal apparatus in which an opening operation is carried out by an one-push button.

BACKGROUND ART

Among portable communication terminal apparatuses such as portable telephones and personal handy phone systems (PHS), there is such a foldable type one that a lower side housing on which various operation keys were disposed and an upper side housing on which a display screen was disposed, were coupled by a hinge mechanism. Such a foldable type portable communication terminal apparatus is configured in such a manner that the hinge mechanism can be opened by an one-push button, as described in the following patent document 1, and thereby, it becomes possible to open the foldable type portable communication terminal apparatus by one hand at the time that there was an incoming call and to talk over the phone.

In addition, as described in the following patent document 2, a portable communication terminal apparatus is configured in such a manner that a talk start key, which should be operated at the time that there was an incoming call, is lighted up by a light emitting device such as LED, to inform a user of the incoming call, and at the same time, a place of a key to be operated next is informed to a user.

(Patent Document 1) JP-A-11-41328 publication
(Patent Document 2) JP-A-6-30086 publication In case of applying a technology, which was described in the patent document 2, to a foldable type portable communication apparatus, a light emitting device is attached to an one-push button for opening a hinge mechanism, and at the time that there was an incoming call, this light emitting device is turned on.

However, various functions are mounted on a recent portable communication terminal apparatus, and there are many cases that, even when a talk over the phone is not carried out, any operation such as preparation of a mail document and playing a game is carried out in such a state that a hinge mechanism was opened. There occurs such a problem that, even when there is an incoming call in the heart of carrying out such an operation and an one-push button is lighted up to have a user pushed the one-push button, a communication line is not connected.

An object of the invention is to provide a foldable type portable communication terminal apparatus which can surely guide a user to a talkable state at the time that there was an incoming call.

DISCLOSURE OF THE INVENTION

A foldable type portable communication terminal apparatus of the invention is characterized by having a hinge mechanism which couples an upper side housing and a lower side housing in such a manner that they can be opened and closed, a push button which opens the hinge mechanism when it was depressed, light emission means which has the push button lighted up at the time of light emission, and control means which turns on the light emission means when the hinge mechanism is closed at the time that there was an incoming call.

By this configuration, a user can understand to simply depress the push button in order to talk over the phone, and further, it is possible to easily let a user know about a position of existence of the push button.

A foldable type portable communication terminal apparatus of the invention is characterized by having a hinge mechanism which couples an upper side housing and a lower side housing in such a manner that they can be opened and closed, a push button which opens the hinge mechanism when it was depressed, first light emission means which has the push button lighted up at the time of light emission, a talk key which starts a talk when it is depressed in such a state that the hinge mechanism was opened, second light emission means which has the talk key lighted up at the time of light emission, opening/closing detection means which detects whether or not the upper side housing and the lower side housing were opened at a predetermined angle or more, and control means which turns on the first light emission means and turns off the second light emission means when the opening/closing detection means detected a "closing" state at the time that there was an incoming call, and turns off the first light emission means and turns on the second light emission means when it detected an "opening" state.

By this configuration, it becomes possible to easily judge that, when the housing is closed, a next operation is depression of the push button and when the housing is opened, a next operation is depression of the talk key, and further, it becomes possible to has a user easily recognized a position of existence of those key and button.

It is characterized in that the control means of the foldable type portable communication terminal apparatus of the invention turns on the first light emission means and turns off the second light emission means when the opening/closing detection means detected the "closing" state after it turned off the first light emission means and turned on the second light emission means since the opening/closing detection detected the "opening" state at the time that there was an incoming call and before the talk key is depressed.

By this configuration, it becomes possible for a user to easily recognize that a next button to be operated is the push button for opening the housing when the opened housing was once closed.

It is characterized in that the control means of the foldable type portable communication terminal apparatus of the invention starts t a talk over the phone when the push button, which was lighted up, was depressed at the time that there was an incoming call and the hinge mechanism was opened.

By this configuration, it is possible to reduce operating procedure up to start of a talk over the phone, and usability of the portable communication terminal is improved.

It is characterized in that the control means of the foldable type portable communication terminal apparatus of the invention starts a talk over the phone after it turns off the light emission means which is in a state of light emission before start of the talk, at the time that there was a talk instruction by use of a hands-free device or an ear phone device after it turned on the light emission means.

By this configuration, it is possible to carry out a talk over the phone by use of a hands-free device or an ear phone device, and it is possible to visually confirm that a control device of a portable type communication terminal apparatus started talk processing, by turning-off of the light emission means.

BRIEF DESCRIPTION OF THE DRAWINGS

FIG. 7 is a view which collected up an opening/closing state of a housing of the foldable type portable communication terminal apparatus which relates to the first embodiment of the invention and a LED ON/OFF state at the time that there is an incoming call.

Figure 1:
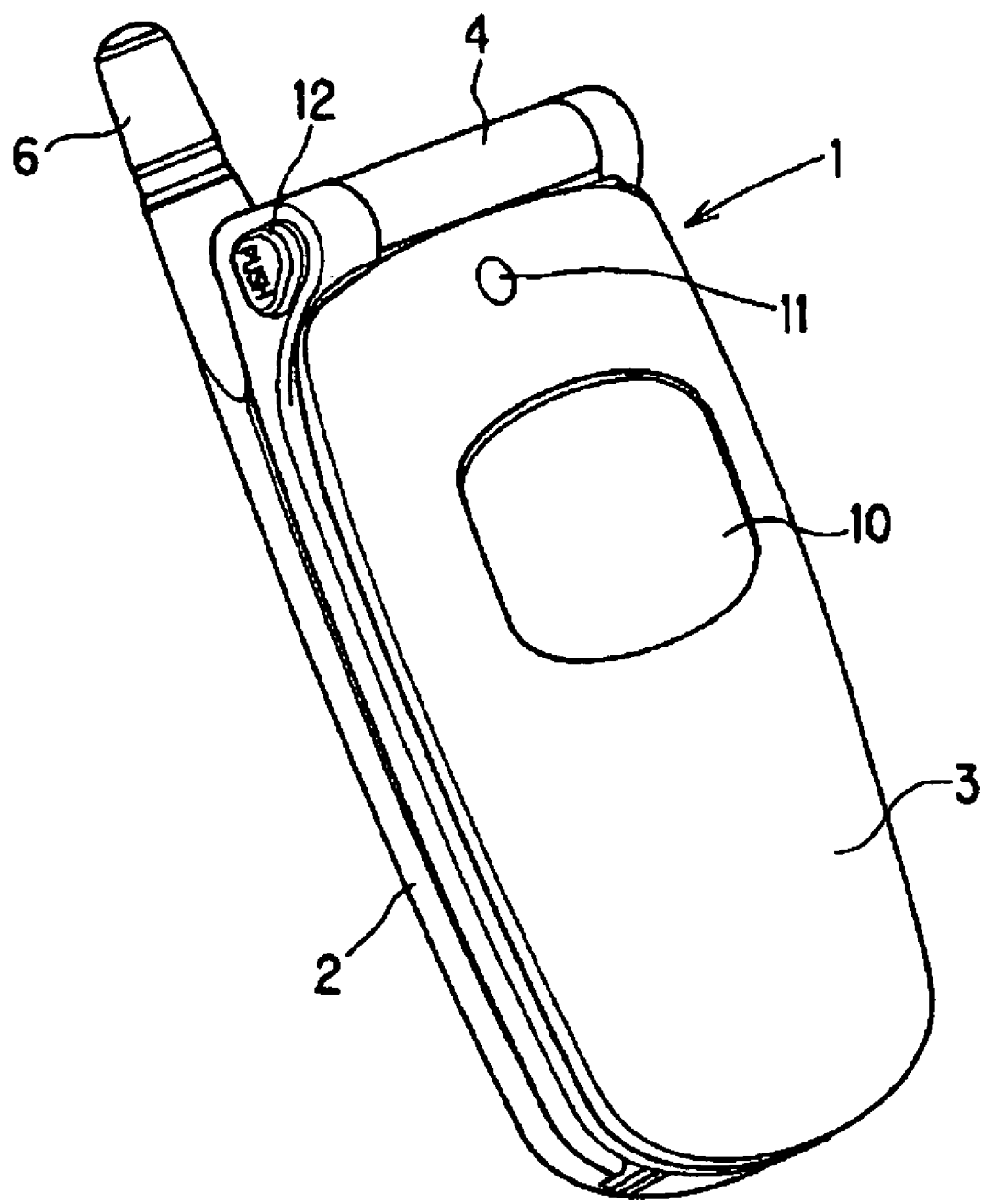
FIG. 1 is an external appearance view of such a state that a foldable type portable communication terminal apparatus, which relates to a first embodiment of the invention, was folded.

Meanwhile, as to reference numerals in the figures, 1 designates a foldable type portable communication terminal apparatus; 2 designates a lower side housing; 2a designates a lower case; 2b designates a lower cover; 2c, 2d designate bearing storage section; 3 designates an upper side housing; 4 designates a hinge mechanism; 5a designates a talk key; 6 designates an antenna; 11 designates LED for an incoming call; 12 designates a one-push button; 13 designates a substrate; 14 designates a key sheet; 17 designates LED for the talk key; 18 designates LED for the one-pushbutton; 19 designates a light guiding hole; 21 designates a circuit control section; and 23 designates an opening/closing detection switch.

BEST MODE FOR CARRYING OUT THE INVENTION

Hereinafter, one embodiment of the invention will be described with reference to the drawings.

Figure 2:
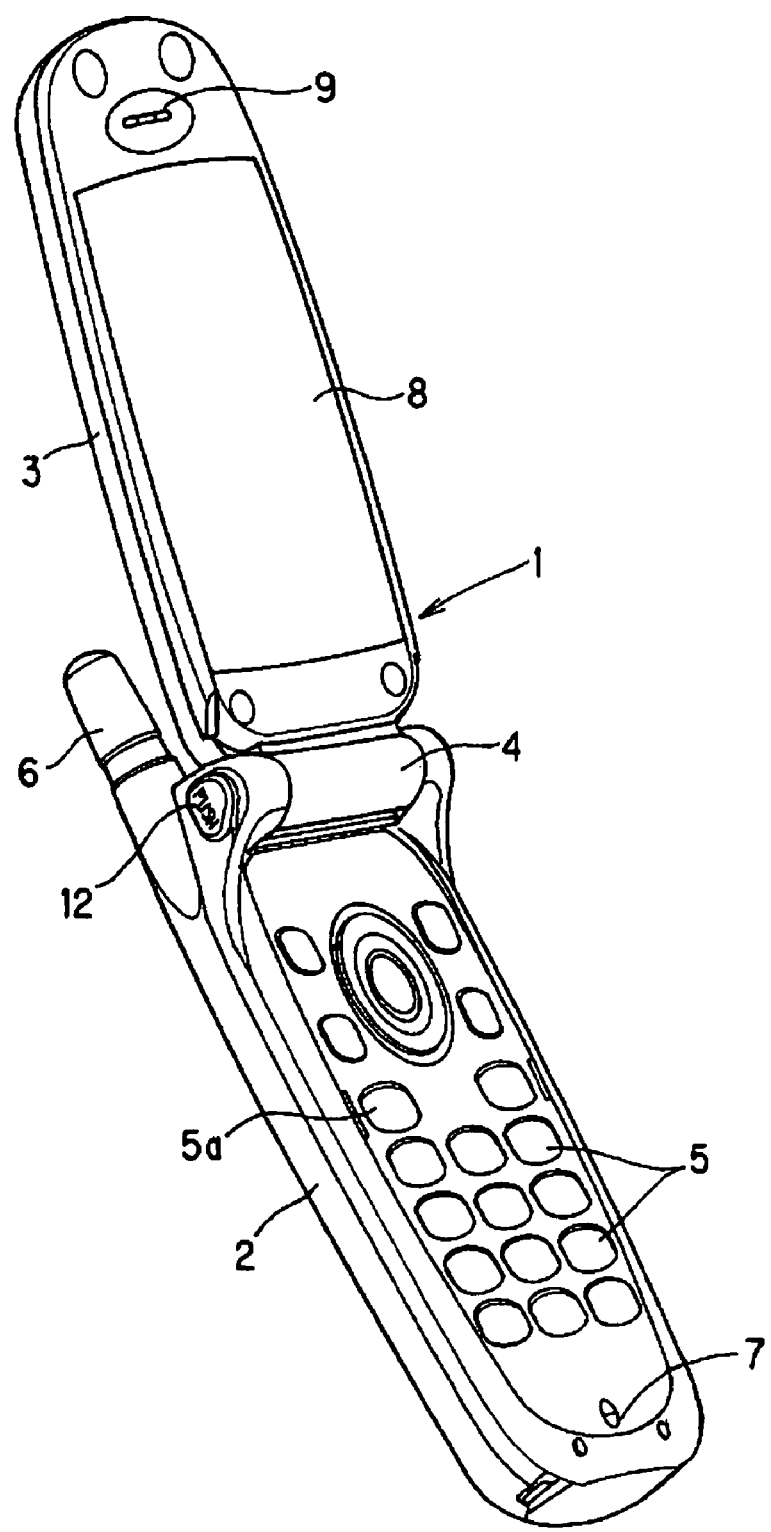
FIG. 2 is an external appearance view of such a state that the foldable type portable communication terminal apparatus, which relates to the first embodiment of the invention, was opened.

FIG. 1 is an external appearance view of such a state that a foldable type portable communication terminal apparatus, which relates to a first embodiment of the invention, was folded, and FIG. 2 is an external appearance view of such a state that it was opened. In this foldable type portable communication terminal apparatus 1, a lower side housing and an upper side housing 3 are coupled by a hinge mechanism 4. On an inside surface of the lower side housing 2 (a surface which hides when it was closed), various operation keys 5 are disposed, and on a side portion, an antenna 6 is disposed, and on the lowermost portion, a through-hole 7 for a telephone microphone is disposed. On an inside surface of the upper side housing 3 (a surface which hides when it was closed), a main display section 8 is disposed, and on the uppermost portion, a through-hole 9 for a telephone receiver is disposed, and on the inside surface and an outside surface which is on an opposite side thereof, as shown in FIG. 1, a sub display section 10 and an incoming call LED 11 are disposed.

On one side of the hinge mechanism 4, an one-push button 12 is disposed, and when this one-push button 12 is depressed, the hinge mechanism 4 is opened, and comes from a state of FIG. 1 into a state of FIG. 2.

Figure 3:
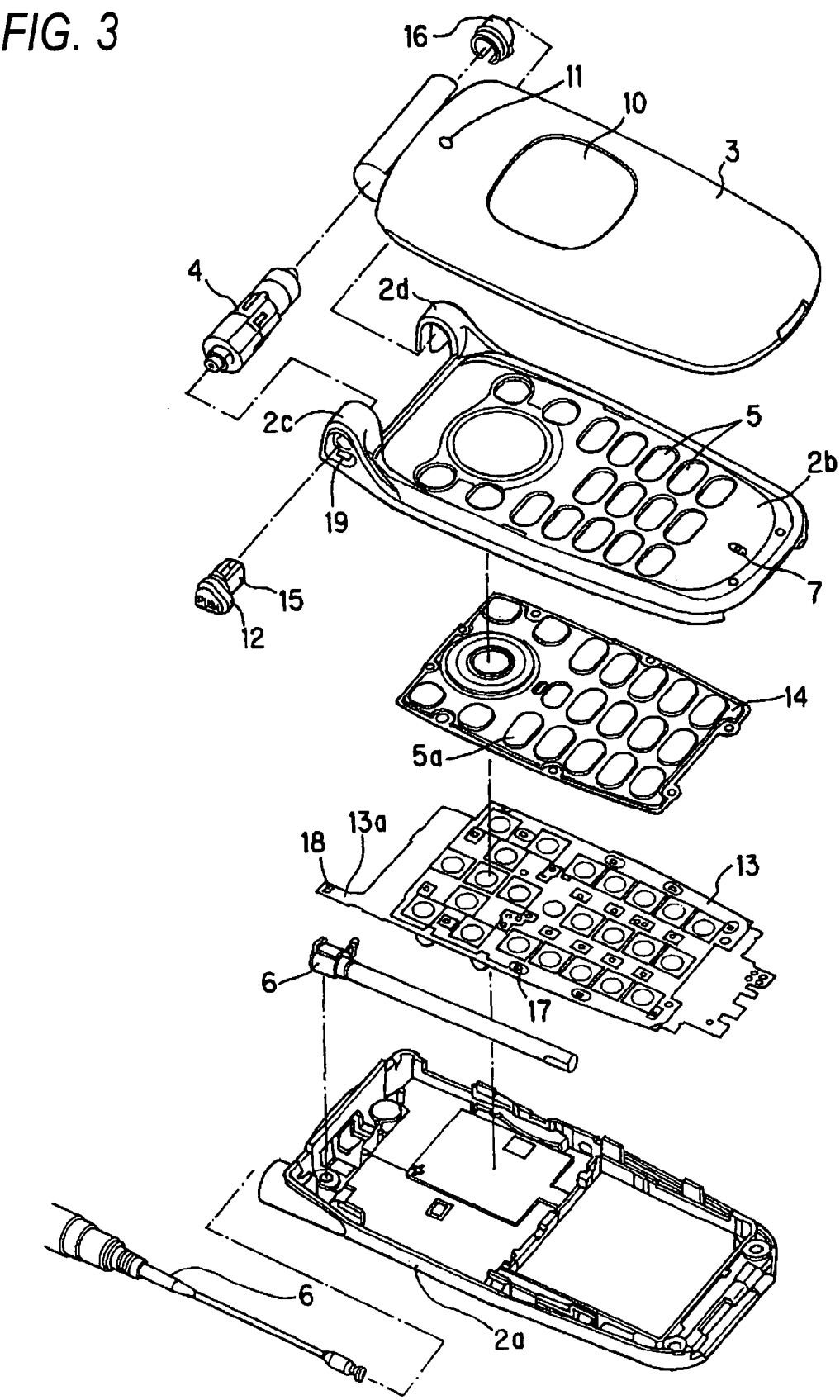
FIG. 3 is an exploded view of the foldable type portable communication terminal apparatus which relates to the first embodiment of the invention.
Figure 4:
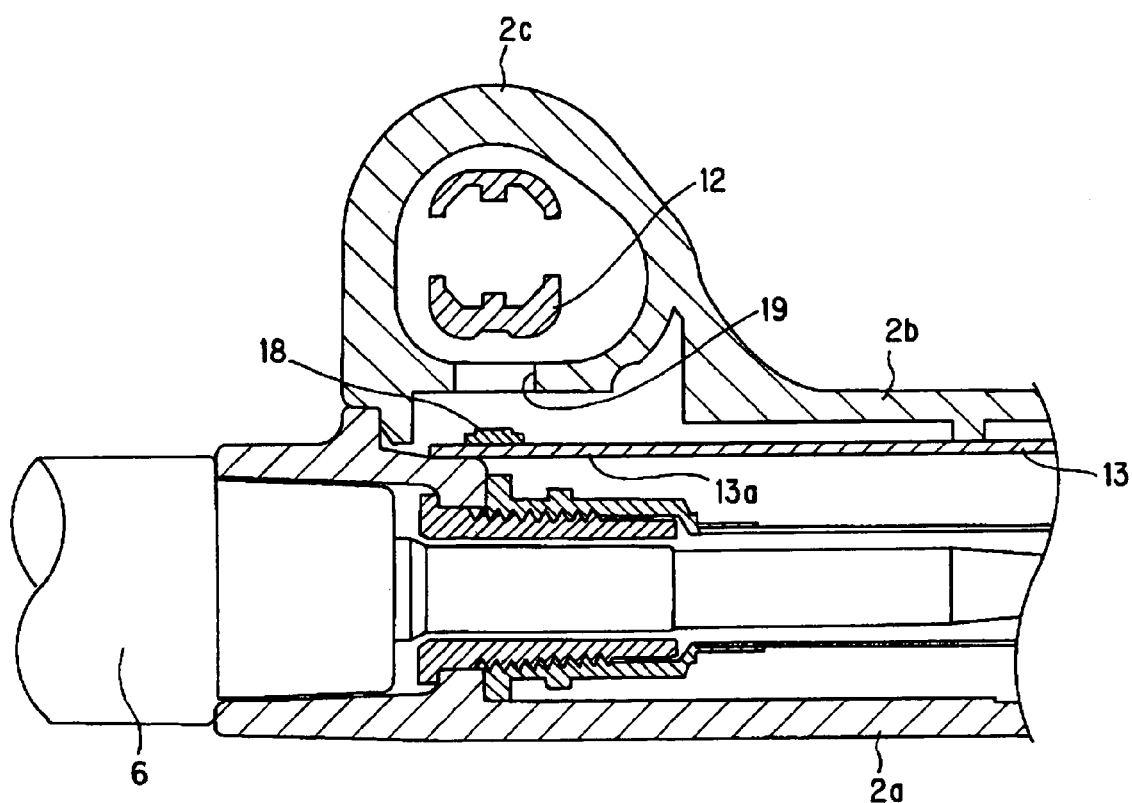
FIG. 4 is a substantial part cross-sectional view of the foldable type portable communication terminal apparatus which relates to the first embodiment of the invention.

FIG. 3 is an exploded view of the foldable type portable communication terminal apparatus shown in FIG. 1, and FIG. 4 is a cross-sectional view of the one-push button 12 portion of this foldable type portable communication terminal apparatus. As shown in FIG. 3, the lower housing 2 is disposed so as to be divided into a lower case 2a and a lower cover 2b, and between the lower case 2a and the lower cover 2b, a substrate 23 for mounting electronic components and a key sheet 14 are sandwiched, and an antenna 6 is incorporated into a side portion.

Both end portions of the hinge mechanism 4 are supported by bearing sections 15, 16, respectively, and one bearing section 15 is coupled to the one-push button 12. Respective bearing section 15, 16 are stored in bearing storage sections 2c, 2d which were formed so as to be evaginated on top end both sides of the lower cover 2b.

On a pertinent position of the substrate 13 which corresponds to a position of the key sheet 14 where a talk key 5a is disposed, LED 17 for the talk key, which has the talk key 5a lighted up or blinked, is disposed.

As shown in FIG. 3 and FIG. 4, one side of the substrate 13, on which the one-push button 12 is disposed, is formed so as to be extended up to an one-push button mounting position, and on a fore-end portion of an extended portion 13a, LED 18 for the one-push button, which is used for lighting or blinking display of the one-push button, is disposed. Then, a light guiding hole 19 is formed in a bottom surface of the above-described bearing storage section 2c which was formed so as to be evaginated, and emitted light of LED 18 passes through the light guiding hole 9 and is guided to a back surface side of the one-push button 12. The one-push button 12 is molded by a milk-white diffusing material, and is configured in such a manner that, when light was guided in the back surface side, the entire one-push button 12 shines.

Figure 5:
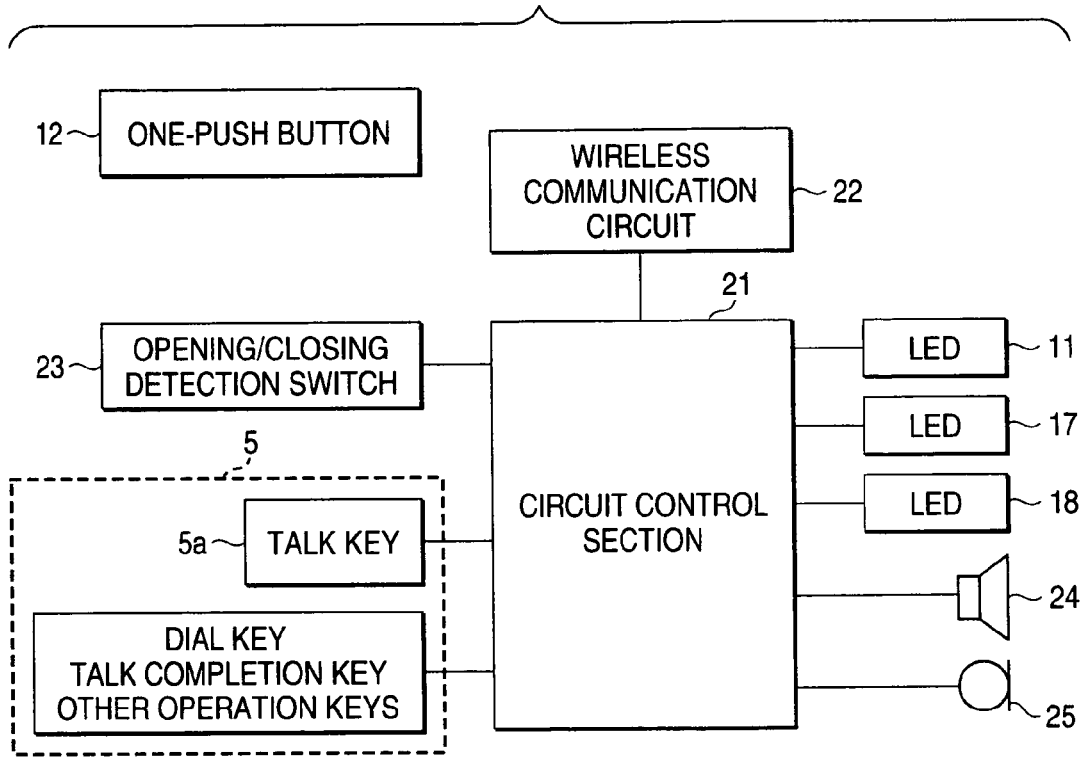
FIG. 5 is a block diagram of an electric control system of the foldable type portable communication terminal apparatus which relates to the first embodiment of the invention.

FIG. 5 is a block diagram of an electric control system which was mounted on the foldable type portable communication terminal apparatus shown in FIG. 1. On the substrate 13, a circuit control section 21, a wireless communication circuit 22 and an opening/closing detection switch 23 which were connected to this circuit control section 21, are disposed, and a telephone receiver 24 which is disposed on a back surface side of the through-hole shown in FIG. 2, and a telephone microphone 25 which is disposed on a back surface side of the through-hole 7, are connected to the circuit control section 21.

The opening/closing detection switch 23 outputs an opening signal to the circuit control section 21 when the upper side housing 3 and the lower side housing 2 are in such a state that they are opened at a predetermined angle or more, and outputs a closing signal to the circuit control section 21 when it is in a state other than that.

In addition, the LED 11 for an incoming call shown in FIG. 1, and LED 17 for the talk key and LED 18 for the one-push button shown in FIG. 3, are connected to the circuit control section 21, and further, various operation keys 5 including the talk key 5a are connected to the circuit control section 21. However, since the one-push button 12 in this embodiment is disposed only for the purpose of simply opening the hinge mechanism mechanically, there is no electric connection of the one-push button 12 and the circuit control section 21.

Figure 6:
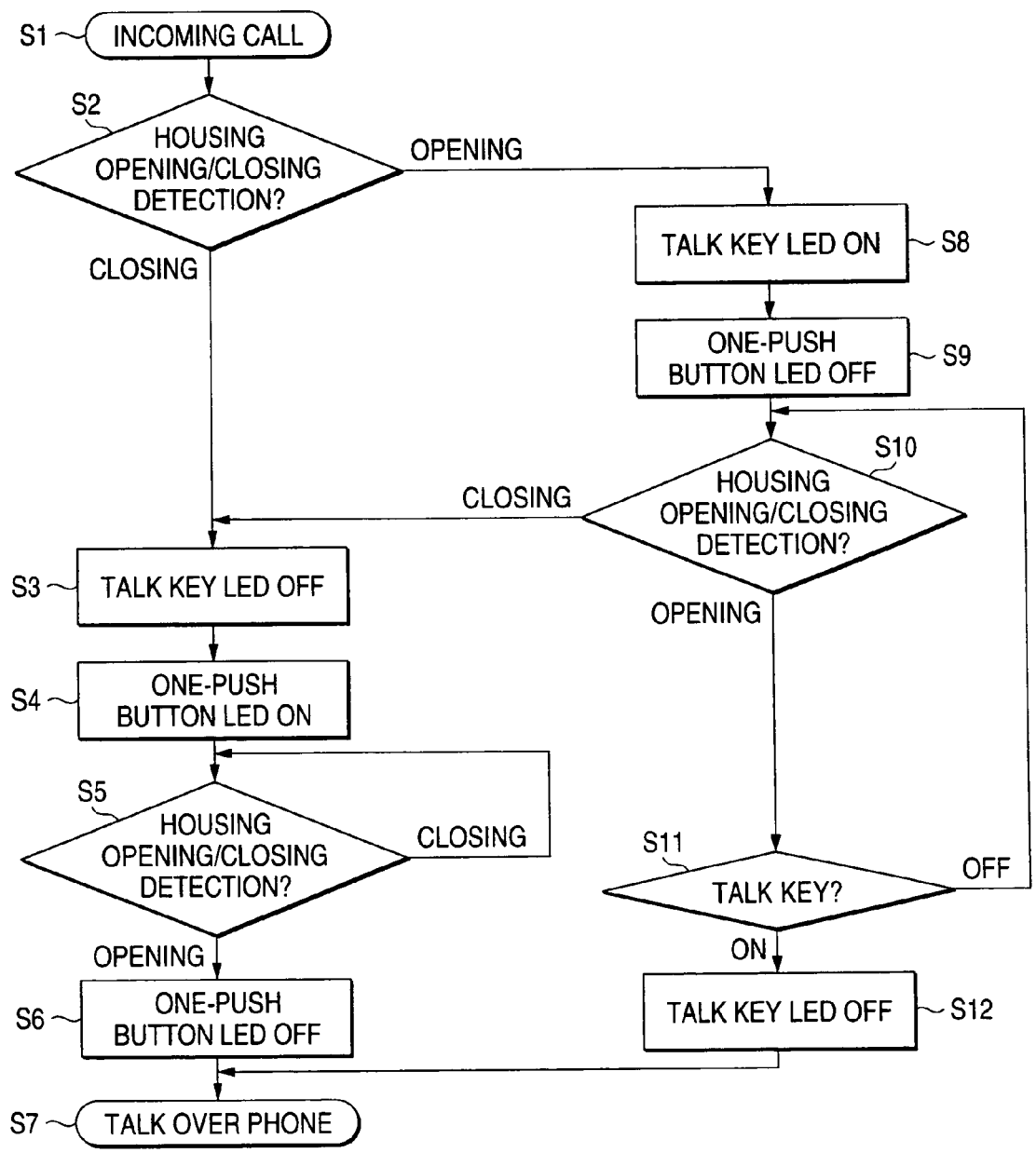
FIG. 6 is a flow chart which shows processing procedures of a circuit control section which is mounted on the foldable type portable communication terminal apparatus which relates to the first embodiment of the invention.

FIG. 6 is a flow chart which shows processing procedures of the circuit control section 21 at the time that there was an incoming call. When there is an incoming call (step S1), the circuit control section 21 detects opening/closing of the housing (step S2). That is, it judges whether the opening/closing detection switch 23 is outputting the opening signal or the closing signal.

In case that the opening/closing detection switch 23 is outputting the closing signal and the housing is closed, LED 15 for the talk key 5*a* is remained OFF (step S3), and then, LED 18 for the one-push button 12 is turned ON (step S4). In such a state that the foldable type portable communication terminal apparatus 1 was folded, a surface on which the operation keys 5 were disposed is hiding, and therefore, even if the talk key 5*a* is lighted up, battery power consumption becomes waste, and therefore, LED 17 is remained OFF, and LED 18 for the one-push button 12 is turned ON, to urge a user to push the one-push button 12.

After LED 18 for the one-push button 12 was turned ON, it waits for such time that the housing is opened (step S5). That is, it waits for such time that the opening signal is outputted from the opening/closing detection switch 23. When a user depresses the one-push button and the housing is opened, the opening/closing detection switch 23 outputs the opening signal, and the circuit control section 21 receives this opening signal to firstly turn off LED 18 (step S6), and starts a talk over the phone by use of the wireless communication circuit 22 (step S7) That is, in this embodiment, a talk over the phone starts when there is an incoming call and the housing is changed from "closing" to "opening", and thereby, depression of the talk key 5*a* becomes unnecessary.

In case that the housing is opened when there was an incoming call (step S1), LED 17 for the talk key 5*a* is turned ON (step S8), and LED 18 for the one-push button 12 is remained OFF (step S9). Since the talk key 5*a* is lighted up and the one-pushbutton 12 is remained no-lighting, it becomes possible for a user to easily judge that a next operation for carrying out a talk over the phone is depression of the talk key 5*a*.

Next, the circuit control section 21 detects again an opening/closing state of the housing (step S10), and if the opening signal is outputted from the opening/closing detection switch 23, it judges whether the talk key 5*a* was depressed or not this time (step S11). In case that the talk key 5*a* is not depressed, it goes back to detection processing of an opening/closing state of the housing (step S10), and in case that the talk key 5*a* was depressed, LED 17 is turned OFF, i.e., lighting is turned off (step S12), and thereafter, it enters into talk processing (step S7).

In case that it was judged that the housing is closed in detection processing of an opening/closing state of the housing (step S10), i.e., in case that there is an incoming call in such a state that the housing was opened and a user closed the housing, in this embodiment, lighting for the talk key 5*a* is turned off (step S3) and lighting for the one-push button 12 is turned on (step S4). Then, when the housing is opened again (step S5), lighting for the one-push button 12 is turned off (step S6), and thereafter, a talk is started (step S7).

In this manner, according to this embodiment, in case that there was an incoming call in such a state that the housing was closed, lighting for the one-push button 12 is turned on to urge a user to depress the one-push button 12, and when the housing is opened, a talk is started without depression of the talk key 5*a*, and in addition, in case that there was an incoming call in such a state that the housing was opened, lighting for the one-push button 12 is turned off and lighting for the talk key 5*a* is turned on, and therefore, it becomes possible for a user to viscerally judge what should be operated next, in order to start a talk.

FIG. 7 is a view which collected up an opening/closing state of the housing and ON/OFF states of LEDs 18, 17, 11. LED for the one-push button is OFF when the housing is in "opening" and ON when the housing is in "closing", and turned OFF when the housing was changed from "closing" to "opening". LED for the talk key is ON when the housing is in "opening" and OFF when the housing is in "closing", and turned OFF so as for a talk to be started, when the housing is changed from "closing" to "opening". LED for an incoming call is turned ON at the time that there was an incoming call whether the housing is in "opening" or "closing", and turned OFF in order for a talk to be started, when the housing was changed from "closing" to "opening".

Figure 8:
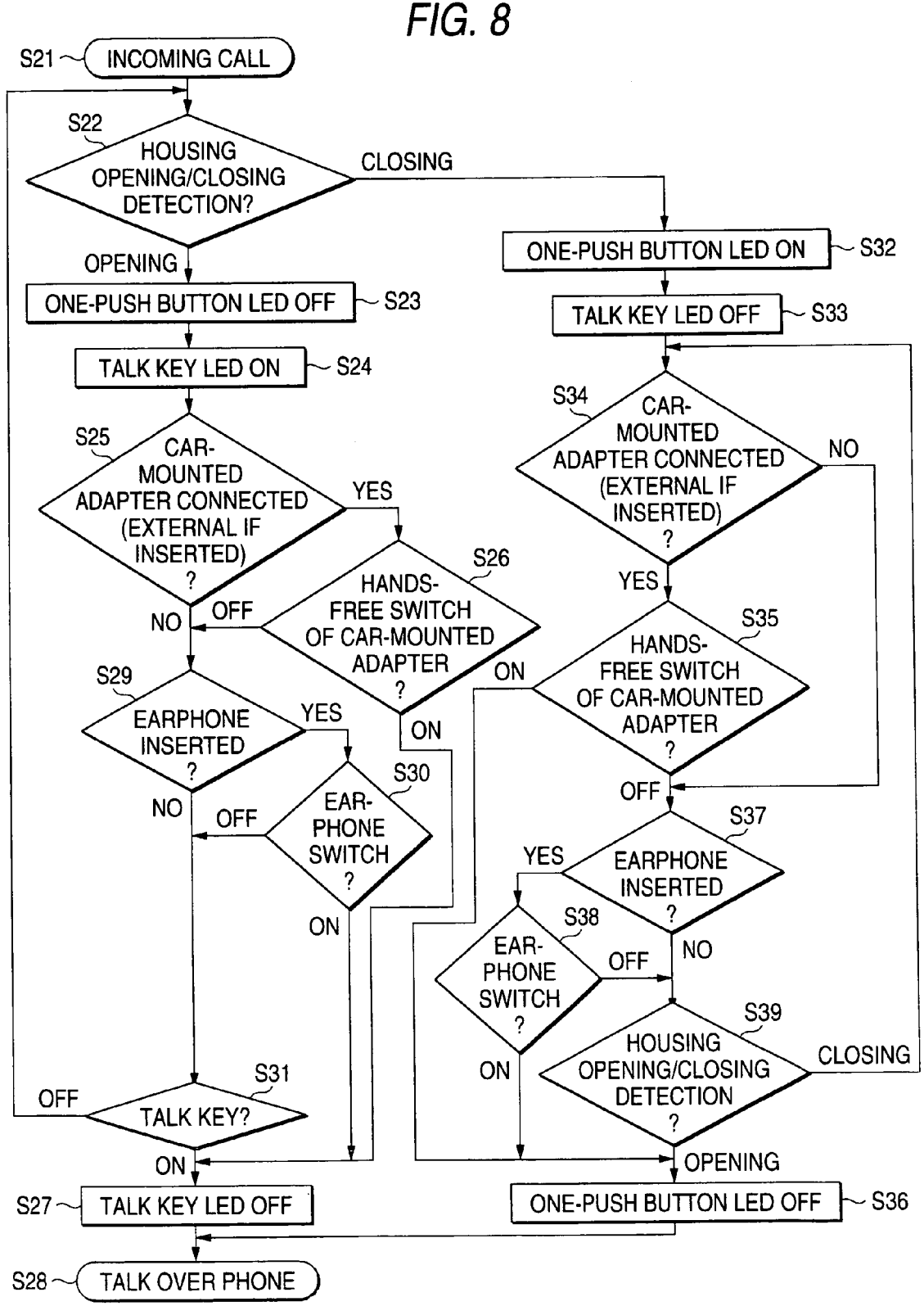
FIG. 8 is a flow chart which shows processing procedures of a circuit control section which is mounted on a foldable type portable communication terminal apparatus which relates to a second embodiment of the invention.

FIG. 8 is a flow chart which shows processing procedures of a circuit control section which relates to a second embodiment of the invention. There is such a case that a portable communication terminal apparatus is used by being connected to a hands-free device when a user is driving a car, and there is also such a case that an earphone is used. Processing procedures in the suchlike cases will be hereinafter described.

When there is an incoming call (step S21), opening/closing of a housing is detected (step S22). When the housing is in "opening", the one-push button 12 is remained OFF (step S23), and lighting for the talk key 5*a* is turned off (step S24).

Then, next, it is judged whether a hands-free car-mounted adapter is connected or not (step S25). In case that the car-mounted adapter is connected, it is judged whether a hands-free switch is ON or OFF (step S26). In case that the hands-free switch is ON, LED 17 for the talk key 5*a* is turned off, in order to start a talk directly (step S27), and thereafter, it enters into talk processing (step S28).

In case that it was judged that the hands-free switch is OFF (step S26), or in case that it was judged that the car-mounted adapter is not connected (step S25), it is next judged whether an earphone is inserted or not (step S29). In case that the earphone is inserted, it is judged whether an earphone switch is ON or OFF (step S30).

Then, in case that the earphone switch is ON, LED for the talk key 5*a* is turned off (step S27), and thereafter, it enters into talk processing (step S28) In case that the earphone is not inserted, it is judged whether the talk key 5*a* was depressed or not (step S31). Even in case that it was judged that the earphone switch is OFF (step S30), it is judged whether this talk key 5*a* was depressed or not (step S31).

In case that the talk key 5*a* was depressed (step S31), LED for the talk key 5*a* is next turned off (step S27), and thereafter, it enters into talk processing (step S28). In case that the talk key 5*a* is not depressed, it goes back to detection processing of an opening/closing state of the housing (step S22).

In case that there is an incoming call (step S21) and it was judged that the housing is in "closing" (step S22), or in case that there was an incoming cal when the housing is in "opening" and a user once closed the housing and thereby it was judged that the housing is in "closing" (step s22), the one-push button 12 is turned ON (step S32), and lighting for the talk key 5*a* is turned off, i.e., LED 17 is remained in a no-lighting state (step S33).

Next, it is judged whether the hands-free car-mounted adapter is connected or not (step S24) In case that the car-mounted adapter is connected, it is next judged whether the hands-free switch is ON or OFF (step S35) In case that the hands-free switch is ON, lighting for the one-push button 12 is turned off (step S36), and thereafter, it enters into talk processing (step S28).

In case that the hands-free switch is OFF (step S35) or in case that it was judged that the car-mounted adapter is not connected (step S34), it is judged whether an earphone is inserted or not (step S37) In case that the earphone is inserted, it is judged whether the earphone switch is ON or OFF (step S38).

In case that the earphone switch is ON, LED for the one-push button 12 is turned OFF (step S36), and thereafter, it enters into talk processing (step S28). In case that the earphone is not inserted (step S37), an opening/closing state of the housing is detected (step S39). Even in case that it was judged that the earphone switch is OFF (step S38), it proceeds on to detection processing of an opening/closing state of the housing (step S39).

In case that the housing was turned into "opening" (step S39), LED for the one-push button 12 is turned off (step S36), and thereafter, it enters into talk processing (step S28). When the housing is remained in "closing", it goes back to judgment processing of whether the car-mounted adapter is connected or not, and it waits for such time that a user talks over the phone by use of each of the hands-free device or the earphone and "opening" of the housing.

In this manner, according to this embodiment, it becomes possible to carry out talk connection by use of these hands-free device and earphone device in case that the hands-free device and an earphone device are connected, in addition to the first embodiment.

The invention was described in detail and with reference to specific embodiments, but it is apparent to a person with ordinary skill in the art that various changes and modifications can be added without departing from spirit and a scope of the invention.

This application is based upon Japanese patent application No. 2003-080890 filed on Mar. 24, 2003, and its content is incorporated herein as a reference.

INDUSTRIAL APPLICABILITY

According to the invention, it is possible to provide a foldable type portable communication terminal apparatus which can surely guide a user to a talkable state at the time that there was an incoming call.

The invention claimed is:

1. A foldable type portable communication terminal apparatus, comprising:
 a hinge mechanism, which couples an upper side housing and a lower side housing such that they can be opened and closed;
 a push button, which opens the hinge mechanism when the push button is pushed;
 light emission means, which has the push button lighted up at the time of light emission;
 opening/closing detection means, which detects whether or not the upper side housing and the lower side housing are opened at a predetermined angle or more; and
 control means, which turns on the light emission means to have the push button lighted up when the opening/closing detection means detected a "closing" state at the time that there is an incoming call, and turns off the light emission means when it detected an "opening" state,
 wherein the control means starts a talk at the time that there is an incoming call and the housing is changed from "closing" to "opening".

2. A foldable type portable communication terminal apparatus, comprising:
 a hinge mechanism, which couples an upper side housing and a lower side housing such that they can be opened and closed;
 a push button, which opens the hinge mechanism when the push button is depressed;
 first light emission means, which makes the push button lighted up at the time of light emission;
 a talk key, which starts a talk when the talk key is depressed in case that the hinge mechanism is opened;
 second light emission means, which makes the talk key lighted up at the time of light emission;
 opening/closing detection means, which detects whether or not the upper side housing and the lower side housing are opened at a predetermined angle or more; and
 control means, which turns on the first light emission means to have the push button lighted up and turns off the second light emission means when the opening/closing detection means detected a "closing" state at the time that there is an incoming call, and turns off the first light emission means and turns on the second light emission means to have the talk key lighted up when it detected an "opening" state,
 wherein the control means starts a talk at the time that there is an incoming call and the housing is changed from "closing" to "opening".

3. The foldable type portable communication terminal apparatus according to claim 2, wherein the control means turns on the first light emission means and turns off the second light emission means when the opening/closing detection means detected the "closing" state after it turned off the first light emission means and turned on the second light emission means since the opening/closing detection detected the "opening" state at the time there is an incoming call and before the talk key is depressed.

4. The foldable type portable communication terminal apparatus according to any one of claims 1 through 3, wherein the control means starts a talk over the phone when the push button, which is lighted up, is depressed at the time that there was an incoming call and the hinge mechanism was opened.

5. The foldable type portable communication terminal apparatus as set forth in any one of claims 1 through 3, characterized in that the control means starts a talk over the phone after it turns off the light emission means which is in a state of light emission before start of the talk, at the time that there was a talk instruction by use of a hands-free device or an ear phone device after it turned on the light emission means.

6. The foldable type portable communication terminal apparatus according to claim 4, characterized in that the control means starts a talk over the phone after it turns off the light emission means which is in a state of light emission before start of the talk, at the time that there was a talk instruction by use of a hands-free device or an ear phone device after it turned on the light emission means.

* * * * *